(12) United States Patent
Speidel et al.

(10) Patent No.: US 9,587,723 B2
(45) Date of Patent: Mar. 7, 2017

(54) DEVICE FOR PRESSING A TRANSMISSION ELEMENT

(71) Applicant: ZF LENKSYSTEME GMBH, Schwaebisch Gmuend (DE)

(72) Inventors: Gerd Speidel, Winterbach (DE); Rainer Schaenzel, Essingen (DE); Thomas Alber, Filderstadt (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 192 days.

(21) Appl. No.: 14/373,482

(22) PCT Filed: Jan. 31, 2013

(86) PCT No.: PCT/EP2013/051863
§ 371 (c)(1),
(2) Date: Jul. 21, 2014

(87) PCT Pub. No.: WO2013/113795
PCT Pub. Date: Aug. 8, 2013

(65) Prior Publication Data
US 2014/0366660 A1    Dec. 18, 2014

(30) Foreign Application Priority Data
Feb. 2, 2012 (DE) .................. 10 2012 100 851

(51) Int. Cl.
*F16H 19/04*      (2006.01)
*B62D 3/12*       (2006.01)
*F16H 55/28*      (2006.01)

(52) U.S. Cl.
CPC ............. *F16H 19/04* (2013.01); *B62D 3/123* (2013.01); *F16H 55/283* (2013.01); *Y10T 74/18096* (2015.01)

(58) Field of Classification Search
CPC ....... F16H 19/04; F16H 55/283; B62D 3/123; Y10T 74/18096
USPC .............................. 74/422, 388 PS
See application file for complete search history.

(56) References Cited

U.S. PATENT DOCUMENTS

| 6,119,540 A | 9/2000 | Phillips | |
|---|---|---|---|
| 6,142,031 A | 11/2000 | Phillips | |
| 6,701,529 B1 * | 3/2004 | Rhoades | C08L 83/14 2/2.5 |
| 9,296,412 B2 * | 3/2016 | Witting | B62D 3/123 |
| 9,321,477 B2 * | 4/2016 | Bae | B62D 3/123 |

(Continued)

FOREIGN PATENT DOCUMENTS

| DE | 10354776 A1 * | 6/2005 | ............. B62D 3/123 |
|---|---|---|---|
| DE | 102006010018 A1 * | 9/2007 | ............. B62D 3/123 |

(Continued)

*Primary Examiner* — David M Fenstermacher
*Assistant Examiner* — Randell J Krug
(74) *Attorney, Agent, or Firm* — Jordan and Koda, PLLC

(57) ABSTRACT

A device for pressing a first transmission element onto a second transmission element engaging in the first transmission element for a rack-and-pinion steering system of a motor vehicle. A pressure piece that can be loaded in the direction of the first transmission element by at least one spring element is displaceably guided in a housing. The spring element is produced from at least one dilatant elastomer.

8 Claims, 6 Drawing Sheets

(56) References Cited

U.S. PATENT DOCUMENTS

| | | | |
|---|---|---|---|
| 2002/0162412 A1* | 11/2002 | Harer | B62D 3/123 74/422 |
| 2004/0171321 A1* | 9/2004 | Plant | A41D 31/005 442/64 |
| 2007/0205572 A1* | 9/2007 | Kubota | B62D 3/123 280/93.514 |
| 2007/0209463 A1* | 9/2007 | Song | B62D 3/123 74/388 PS |
| 2008/0034903 A1* | 2/2008 | Hafermalz | B62D 3/123 74/89.19 |
| 2008/0034910 A1* | 2/2008 | Roline | B62D 3/123 74/422 |
| 2008/0078263 A1* | 4/2008 | Pattok | B62D 5/0403 74/388 PS |
| 2012/0266707 A1* | 10/2012 | Brochot | B62D 3/123 74/409 |
| 2013/0068048 A1* | 3/2013 | Bareis | B62D 3/123 74/55 |
| 2014/0013901 A1* | 1/2014 | Urbach | F16H 55/283 74/606 R |

FOREIGN PATENT DOCUMENTS

| | | | | |
|---|---|---|---|---|
| DE | | 102008040508 A1 * | 1/2010 | ............. B62D 3/123 |
| LI | DE | 102011109878 A1 * | 2/2013 | ............. B62D 3/123 |
| WO | | WO 9738244 A1 * | 10/1997 | ............. B62D 3/123 |
| WO | | WO-02/088572 | 11/2002 | |

* cited by examiner

DEVICE FOR PRESSING A TRANSMISSION ELEMENT

BACKGROUND OF THE INVENTION

The invention relates to a device for pressing a first transmission element onto a second transmission element engaging in the first transmission element, in particular for a rack-and-pinion steering system of a motor vehicle, comprising a pressure piece that can be loaded in the direction of the first transmission element by at least one spring element and is displaceably guided in a housing.

A coil spring is used as the spring element in devices of the type in question that are known from the prior art. The task of the coil spring is to press a toothed rack against a pinion during driving operation so that undesirable noise can be prevented. The noise can develop either in a contact region between a pressure piece and an adjusting screw when quickly turning a steering wheel back and forth or when driving across a bumpy route, or between the pressure piece and the toothed rack, or between the toothed rack and the pinion. The noise that thus develops during actuation of the steering system can also occur when the motor vehicle is stopped or driving slowly. However, the attempt to solve this problem with a spring element having an increased spring force does not produce a satisfactory result, since the increased spring force also necessitates an increased displacement force for moving the toothed rack. The increased displacement force consequently reduces the steering comfort when driving at high speeds, and in particular excessively high resistance must be overcome when initiating a steering motion.

SUMMARY OF THE INVENTION

It is the object of the invention to reduce undesirable noise in the above-mentioned device, without worsening the steering comfort.

This object is achieved by a device of the type in question, in which according to the invention the at least one spring element is produced from at least one dilatant elastomer. The elastomer that is used is preferably a polyborosiloxane. The first transmission element can be a toothed rack, and the second transmission element can be a pinion engaging in the toothed rack. The dilatant elastomer has a modulus of elasticity composed of a loss modulus and a storage modulus. The loss modulus gives the spring element a softer characteristic curve, which takes effect at a lower steering change frequency, and the storage modulus gives it a more rigid characteristic curve, which takes effect at a high steering change frequency or when driving over a bumpy route. As a result, the spring element produced from the dilatant elastomer can reliably press a pressure piece against the toothed rack, and press the toothed rack against the pinion, both at a low steering change frequency and at a high steering change frequency, and when driving over bumpy routes. Undesirable noise is thus reliably suppressed.

The pressing pressure of the at least one spring element is particularly effective when the at least one dilatant elastomer has the shape of a cone, a truncated cone, a disk, a ring or an O-ring.

The at least one spring element can be disposed in a cavity in the pressure piece. The cavity is simple and cost-effective to produce from a manufacturing perspective. It thus determines a precisely defined position of the spring element, so that the spring element can reliably fulfill the function thereof.

The cavity can be closed with a cover, and more particularly it can be closed in a gas-tight manner. It is thus ensured that the at least one elastomer can preserve its moisture and not dry out, whereby a flawless function is ensured even over long operating periods.

As an alternative, an adjustment unit can be disposed in the cavity. This unit equalizes play that is preferably wear-induced and that occurs in the steering system over the course of the operation.

So as to ensure optimal pressing of the toothed rack against the pinion, the cover can press against the at least one spring element. An adjusting screw can press against the cover for the same reason, so that the adjusting screw can exert a pressing pressure onto the spring element.

So as to be able to precisely adjust the pressing of the toothed rack against the pinion, a threaded bolt can be provided in the adjusting screw for the fine adjustment of a preload of the spring element.

The at least one elastomer can be provided with a sheathing using a dipping method. The sheathing can preferably be produced from latex. The sheathing provides a protective layer for the elastomer so as to protect the same from corrosive media and from drying out, for example.

The characteristic curve of the loss modulus and the characteristic curve of the storage modulus of the at least one dilatant elastomer, plotted over a frequency, can intersect in a frequency range of 2 Hz to 15 Hz. This frequency range has proven to be particularly effective in practical experience for achieving optimal pressing at low and at high steering change frequencies.

In a preferred embodiment, the at least one elastomer designed as an O-ring can be disposed in at least one groove extending around the circumference of the pressure piece. The undesirable noise is thus prevented even more effectively.

So as to adjust the optimal point of intersection between the characteristic curve of the loss modulus and the characteristic curve of the storage modulus, the at least one dilatant elastomer can be provided with a filler. Fumed silica is particularly well-suited for this purpose.

A preferred exemplary embodiment of the device according to the invention will be described hereafter in more detail based on the accompanying drawings.

DETAILED DESCRIPTION OF THE PREFFERED EMBODIMENTS

Figure 1:
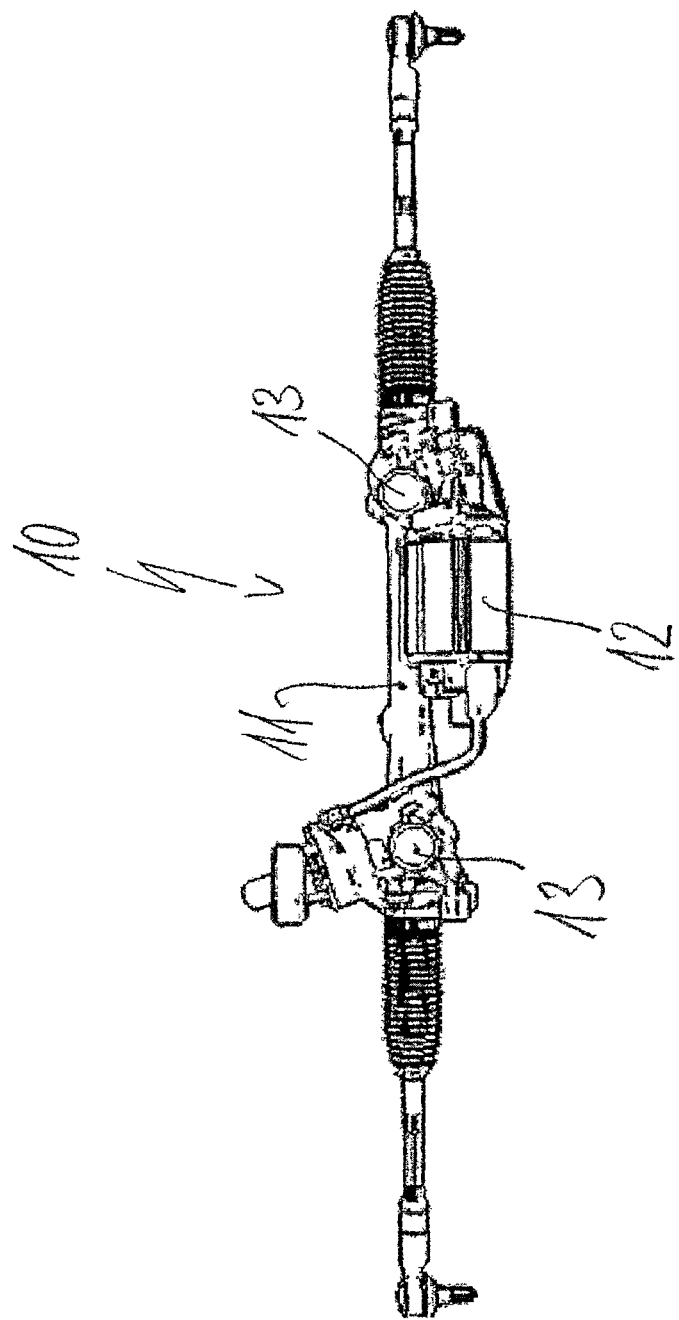
FIG. 1 is a top view onto a steering system of a motor vehicle.

FIG. 1 shows a steering system 10, in particular an electric power steering system for a motor vehicle, comprising a housing region 11 holding a toothed rack, a housing region 12 behind which an electric motor is mounted, and devices 13 for pressing the toothed rack against two pinions, which are not shown in detail here. The toothed rack corresponds to a first transmission element, and the pinion corresponds to a second transmission element.

Figure 2:
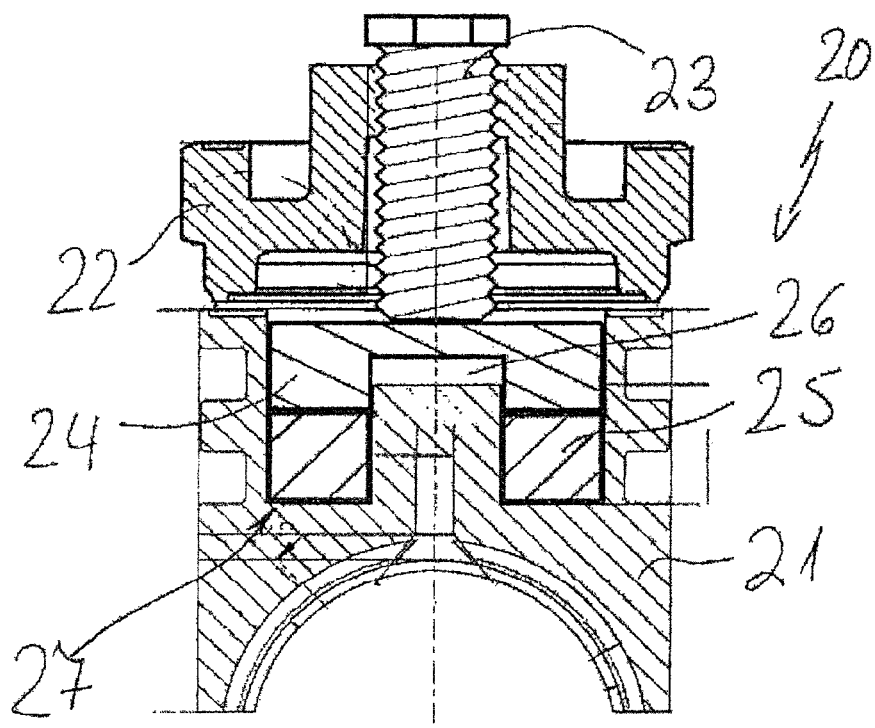
FIG. 2 is a sectional view through a first embodiment of the device.

FIG. 2 shows a device 20 for pressing the toothed rack onto the pinion. The device 20 comprises a pressure piece 21, against which an adjusting screw 22 presses. The adjusting screw 22 has an external thread, which is not shown in detail here, which can be used to screw the adjusting screw into a housing, which likewise is not shown, in which the pressure piece 21 is guided.

A threaded bolt 23, which presses against a cover 24, is screwed into the adjusting screw 22. The cover 24 presses against a spring element 25, which is produced from a dilatant elastomer in the shape of a ring having a rectangular cross-section. The threaded bolt 23 is thus used for the fine adjustment of a preload of the spring element 25.

The cover 24 has a crucible-shaped design. The pressure piece 21 therefore has a cavity 26 including a peripheral groove 27 for accommodating the cover 24 and the spring element 25.

Figure 3:
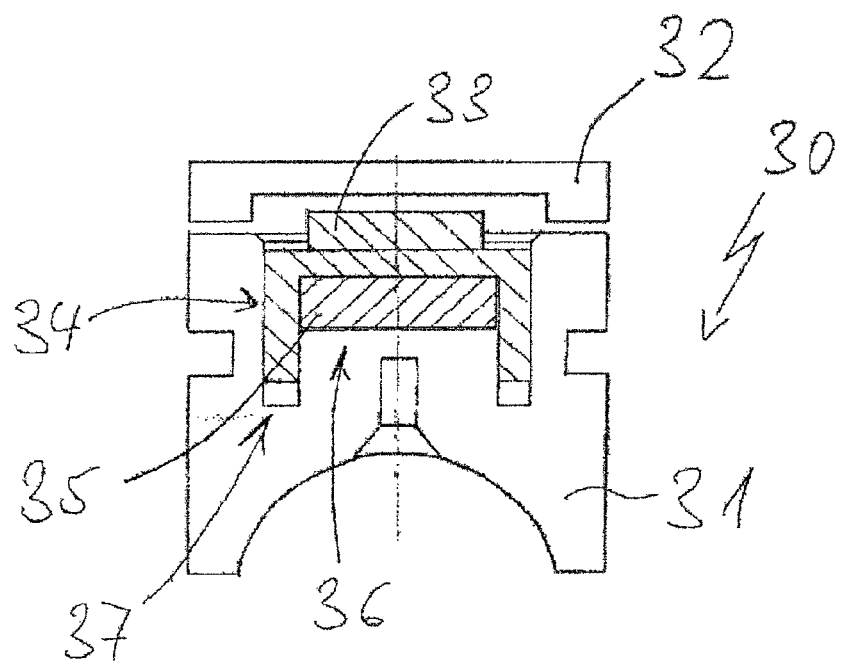
FIG. 3 is a schematic sectional view through a second embodiment of the device.

FIG. 3 shows a device 30 comprising a pressure piece 31 and a schematically illustrated adjusting screw 32, into which a threaded bolt can likewise be screwed, but which is not shown here for the sake of better illustration.

The adjusting screw 32 presses onto a cover 34, which has a shoulder 33 and presses onto a disk-shaped spring element 35 produced from the dilatant elastomer. The cover 34 likewise has a crucible-shaped design. The pressure piece 31 has a cavity 36 including a peripheral groove 37 for accommodating the cover 34 and the spring element 35.

Figure 4:
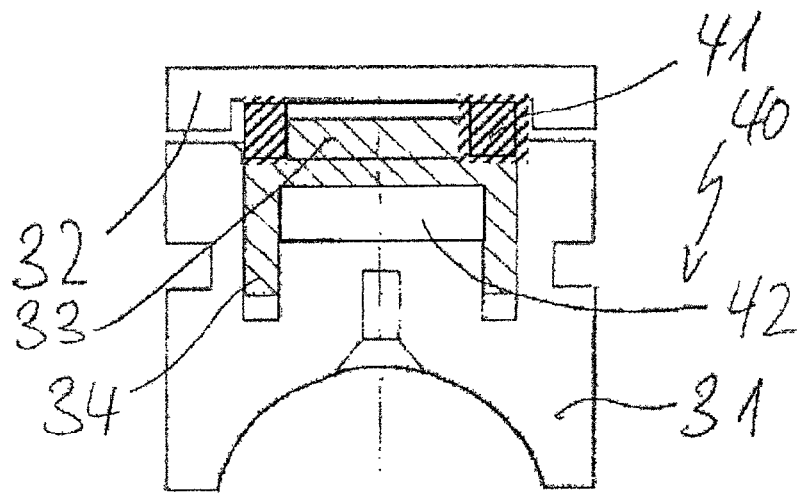
FIG. 4 is a schematic sectional view through a third embodiment of the device.
Figure 5:
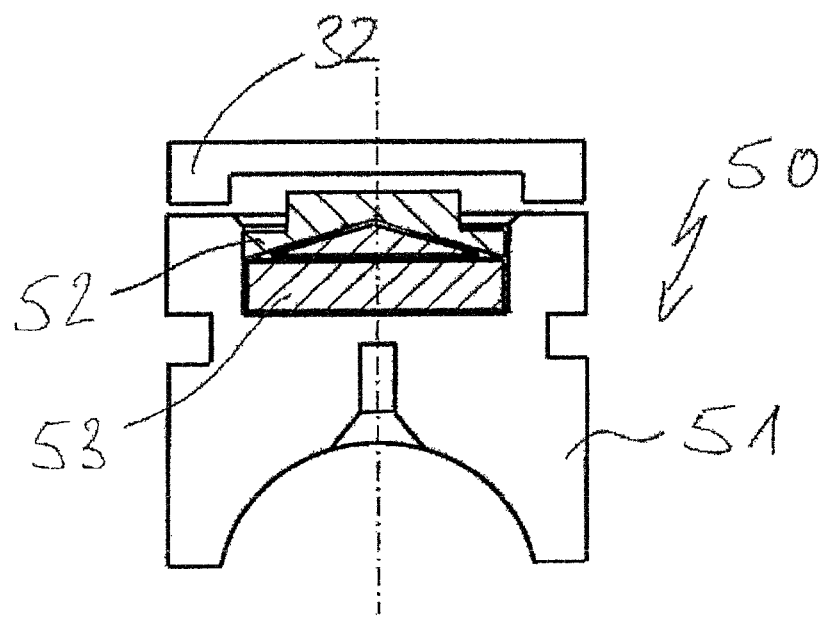
FIG. 5 is a schematic sectional view through a fourth embodiment of the device.

In the device 40 comprising the pressure piece 31 and the cover 34, an annular spring element 41 is disposed between the adjusting screw 32 and the cover 34 (see FIG. 4). The spring element 41 is likewise produced from the dilatant elastomer. The element is placed over the shoulder 33 and is thus centered. Moreover, a component 42, which can either be a spacer washer or a further spring element produced from the dilatant elastomer, is disposed between the cover 34 and the pressure piece 31.

In a device 50 comprising a pressure piece 51 and a cover 52, the adjusting screw 32 presses against the cover 52, which presses against a conical spring element 53 produced from the dilatant elastomer. The cover 52 is adapted to the conical contour of the spring element 53, so that the pressure from the adjusting screw 32 or the threaded stud, which likewise is not shown here, is optimally transmitted to the spring element 53.

Figure 6:
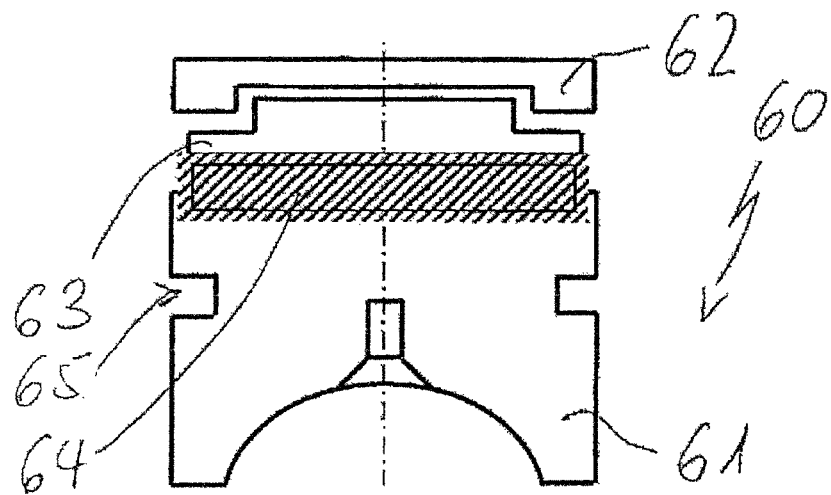
FIG. 6 is a schematic sectional view through a fifth embodiment of the device.

FIG. 6 shows a device 60 comprising a pressure piece 61 and an adjusting screw 62. A cover 63, which presses against a disk-shaped spring element 64, is disposed beneath the adjusting screw 62. Additionally, the pressure piece 61 includes a peripheral groove 65, in which an O-ring, which likewise is preferably produced from the dilatant material, can be disposed.

Figure 7:
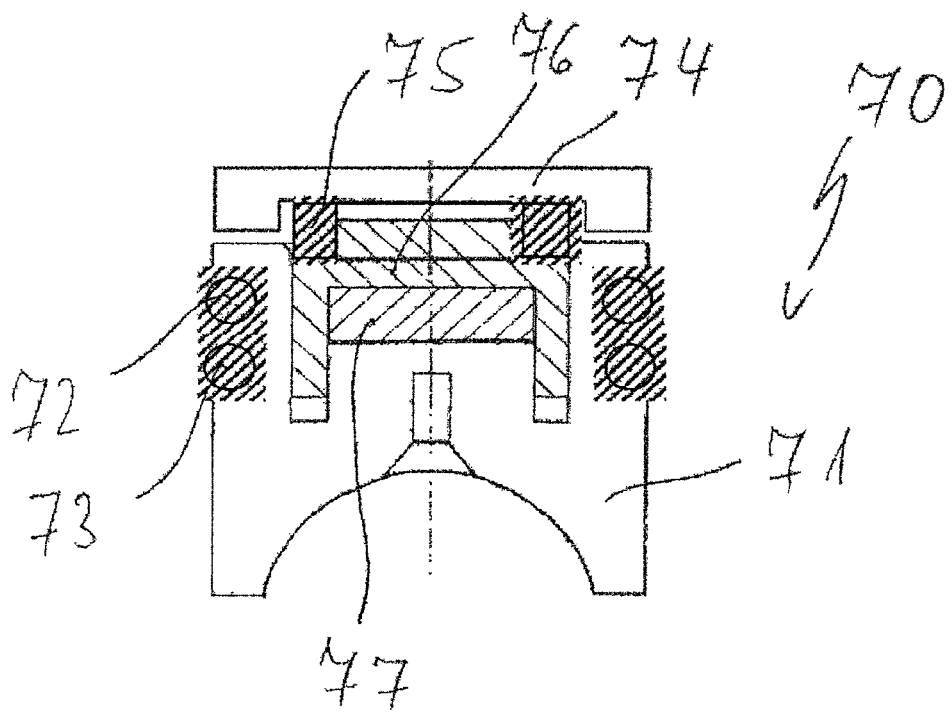
FIG. 7 is a schematic sectional view through a sixth embodiment of the device.

FIG. 7 shows a device 70 comprising a pressure piece 71 in which two O-rings 72 and 73 are disposed in two peripheral grooves. An annular first spring element 75 is disposed beneath an adjusting screw 74, and a second disk-shaped spring element 77 is disposed beneath a cover 76. The adjusting screw 74 thus presses against the spring element 75, and the spring element 75 presses against the cover 45, which presses against the spring element 77. The O-rings 72 and 73 and the spring elements 75 and 77 are produced from the dilatant elastomer. The O-rings 72 and 73 thus acoustically decouple the pressure piece 71 from the housing surrounding the pressure piece 71. As a result of the use of the dilatant elastomer, the acoustic decoupling is particularly effective.

Figure 8:
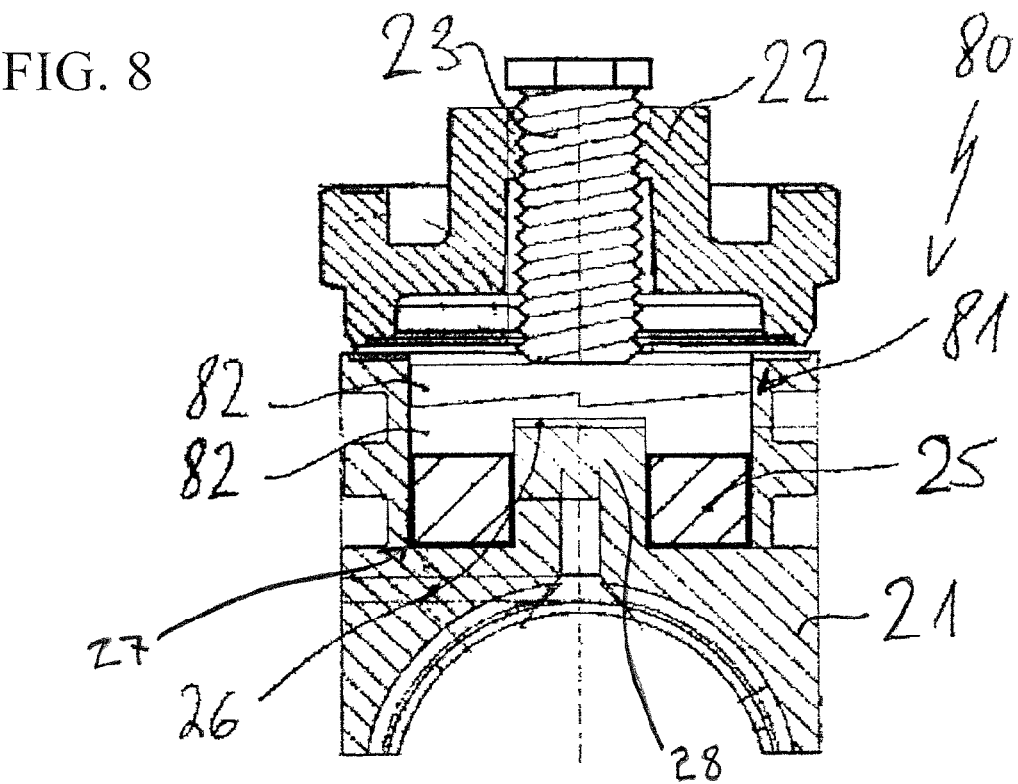
FIG. 8 is a schematic sectional view through a seventh embodiment of the device.

A device 80 for pressing the toothed rack onto the pinion is configured with a pressure piece 21 (see FIG. 8). The adjusting screw 22 presses against the pressure piece 21. The threaded bolt 23 is screwed into the adjusting screw 22. The threaded bolt 23 presses against an adjustment unit 81, which comprises two disks 82. The adjustment unit 81 presses against the spring element 25. FIG. 8 shows the cavity 2 present between a central portion 28 of the pressure piece 21 and a corresponding central portion of the adjusting unit 81.

The adjustment unit 81 equalizes play that is preferably wear-induced and that occurs in the steering system over the course of the operation.

Figure 9:
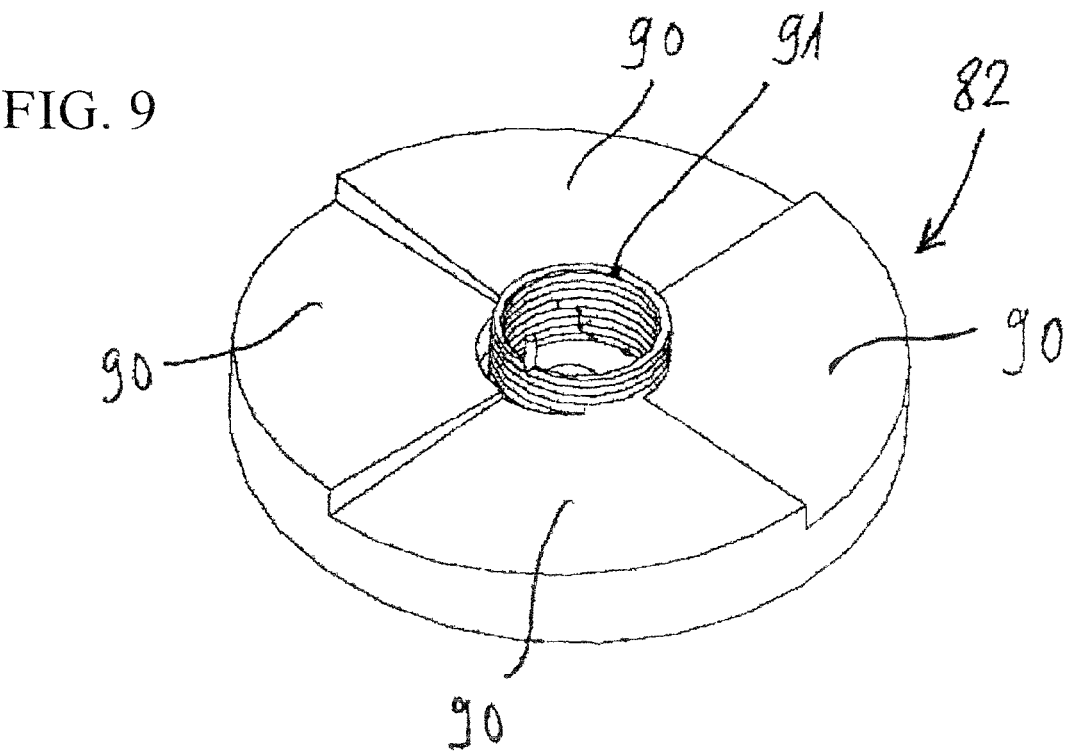
FIG. 9 is a perspective top view onto a disk.

The two disks 82 (see FIGS. 8 and 9) in each case comprise four oblique surface segments 90, on which the disks 82 are seated against one another.

A borehole for accommodating a torsion spring 91 is located in the center of the disks 82. The torsion spring 91 rotates the two disks 82 against one another in such a way that the overall thickness of the two disks 82 increases as soon as play develops due to wear and/or settling of the toothed rack, of the pressure piece 21, or of a foil disposed between the toothed rack and the pressure piece 21, the foil not being shown here. In this way, the play is thus compensated for, and the pressure piece 21 presses onto the toothed rack substantially without play.

The four oblique surface segments 90 have only a very small angle of inclination. The spring element 25, acting axially onto the disks 82, is thus prevented from rotating the disks 82 against the force generated by the torsion spring 91 in a manner such that the adjustment unit 81 would not be able fulfill its function.

Figure 10:
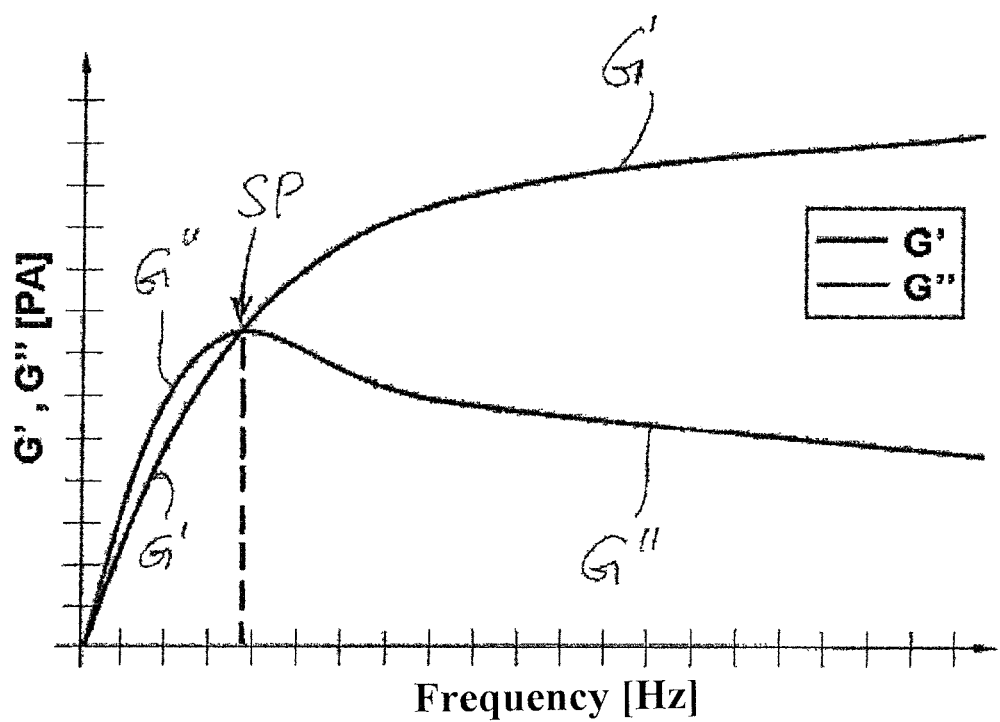
FIG. 10 is a characteristic curve of a loss modulus and a characteristic curve of a storage modulus of a dilatant elastomer, plotted over a frequency.

FIG. 10 shows a characteristic curve G" of a loss modulus and a characteristic curve G' of a storage modulus of a dilatant elastomer, plotted over a frequency. The two characteristic curves G" and G' intersect at a point of intersection SP, which is above a certain threshold frequency. The left area of the characteristic curve G" takes effect during slow steering movements, which is to say with low steering change frequencies, as they occur in particular when driving at high speed, such as on a highway. The right area of the characteristic curve G' takes effect during fast steering movements, which is to say with high steering change frequencies, as they occur when driving slowly or when stopped, such as during parking or when driving over a bumpy route.

The point of intersection SP is advantageously located in a frequency range of 2 Hz to 15 Hz. This frequency range has proven to be particularly effective in practical experience for achieving optimal pressing at low and at high steering change frequencies.

| List of Reference Numerals and Symbols |
| --- |
| 10 steering system |
| 11 housing region |
| 12 housing region |
| 13 device |
| 20 device |
| 21 pressure piece |
| 22 adjusting screw |
| 23 threaded bolt |
| 24 cover |
| 25 spring element |
| 26 cavity |
| 27 groove |
| 30 device |
| 31 pressure piece |
| 32 adjusting screw |
| 33 shoulder |
| 34 cover |
| 35 spring element |
| 36 cavity |
| 37 groove |
| 40 device |
| 41 spring element |
| 42 component |
| 50 device |
| 51 pressure piece |
| 52 cover |
| 53 spring element |
| 60 device |
| 61 pressure piece |
| 62 adjusting screw |
| 63 cover |
| 64 spring element |
| 65 groove |
| 70 device |
| 71 pressure piece |
| 72 O-ring |
| 73 O-ring |
| 74 adjusting screw |
| 75 spring element |
| 76 cover |
| 77 spring element |
| 80 device |
| 81 adjustment unit |
| 82 disk |
| 90 surface segment |
| 91 torsion spring |
| G' characteristic curve storage modulus |
| G" characteristic curve ass modulus |
| SP point of intersection |

The invention claimed is:

1. A device for pressing a first transmission element onto a second transmission element engaging in the first transmission element for a rack-and-pinion steering system of a motor vehicle, comprising:
a housing,
a pressure piece, and
at least one spring element,
wherein the pressure piece is loaded in the direction of the first transmission element by the at least one spring element and is displaceably guided in the housing,
wherein the spring element comprises at least one dilatant elastomer that has a modulus of elasticity composed of a loss modulus and a storage modulus that have characteristic curves intersecting at a point of intersection,
wherein the spring element is configured so that at a first steering change frequency a part of the characteristic curve of the loss modulus oriented on a left side of the point of intersection is in effect, and at a second steering change frequency greater than the first steering change frequency a part of the characteristic curve of the storage modulus oriented on a right side of the point of intersection is in effect,
wherein the at least one spring element is disposed in a cavity in the pressure piece,
wherein an adjustment unit is disposed in the cavity, and
wherein an adjusting screw presses against the adjustment unit.

2. The device according to claim 1, wherein the at least one dilatant elastomer has the shape of a cone, a truncated cone, a disk, a ring or an O-ring.

3. A device according to claim 1, wherein the at least one elastomer is provided with a sheathing.

4. A device according to claim 1, wherein a characteristic curve of a loss modulus and a characteristic curve of a storage modulus of the at least one dilatant elastomer, plotted over a frequency, intersect in a frequency range of 2 Hz to 15 Hz.

5. A device according to claim 1, wherein the at least one dilatant elastomer is provided with a filler.

6. A device according to claim 1, wherein the adjustment unit presses against the at least one spring element.

7. The device according to claim 1, wherein a threaded bolt is provided in the adjusting screw for the fine adjustment of a preload of the spring element.

8. The device according to claim 1,
wherein the at least one dilatant elastomer has an annular shape with a central through-opening into which mates a central portion of the pressure piece, and
wherein a gap is present between the central portion of the pressure piece and a corresponding central portion of the adjustment unit.

* * * * *